United States Patent [19]

Inoue

[11] Patent Number: 4,971,413

[45] Date of Patent: Nov. 20, 1990

[54] LASER BEAM DEPICTING APPARATUS

[75] Inventor: Fuyuhiko Inoue, Sagamihara, Japan

[73] Assignee: Nikon Corporation, Tokyo, Japan

[21] Appl. No.: 277,860

[22] Filed: Nov. 30, 1988

Related U.S. Application Data

[63] Continuation-in-part of Ser. No. 192,685, May 10, 1988, abandoned.

[30] Foreign Application Priority Data

May 13, 1987 [JP] Japan .................. 62-116580
Dec. 2, 1987 [JP] Japan .................. 62-303401

[51] Int. Cl.⁵ .............................. G02B 26/10
[52] U.S. Cl. ...................... 350/6.8; 250/236; 358/199; 358/206; 350/6.7
[58] Field of Search .......... 350/6.8, 6.7, 6.6, 6.5; 250/235, 236; 358/199, 201, 206, 225, 226, 227, 474, 293

[56] References Cited

U.S. PATENT DOCUMENTS

| | | | |
|---|---|---|---|
| 3,944,323 | 3/1976 | Starkweather | 350/6.8 |
| 4,180,822 | 12/1979 | Hudson et al. | 350/6.8 |
| 4,270,131 | 5/1981 | Tompkins et al. | 350/6.8 |
| 4,272,151 | 6/1981 | Balasubramanian | 350/6.8 |
| 4,308,544 | 12/1981 | Lucero et al. | 350/6.8 |
| 4,350,988 | 9/1982 | Masegi | 350/6.6 |
| 4,639,073 | 1/1987 | Yip et al. | 350/6.8 |
| 4,776,654 | 10/1988 | Ishizuka et al. | 350/6.7 |

FOREIGN PATENT DOCUMENTS 61-193130 8/1986 Japan .
63-36222 2/1988 Japan .

Primary Examiner—Bruce Y. Arnold
Assistant Examiner—Loha Ben
Attorney, Agent, or Firm—Shapiro and Shapiro

[57] ABSTRACT

A laser beam depicting apparatus adapted to depict a raster image by modulating a laser beam by image data and raster-scanning the laser beam by the reflecting surfaces of a rotational polygonal mirror comprises a laser source for producing a laser beam by oscillating light components of plural wavelengths at the same time, a light modulator for modulating the laser beam without causing color dispersion, a light deflector for correcting any deviation in a direction orthogonal to the deflection of the laser beam caused by the tilting error of each reflecting surface of the rotational polygonal mirror without causing color dispersion, and an $f\theta$ lens having its chromatic aberration corrected for condensing the laser beam deflected by the rotational polygonal mirror in order to raster-scan an object to be depicted.

10 Claims, 6 Drawing Sheets

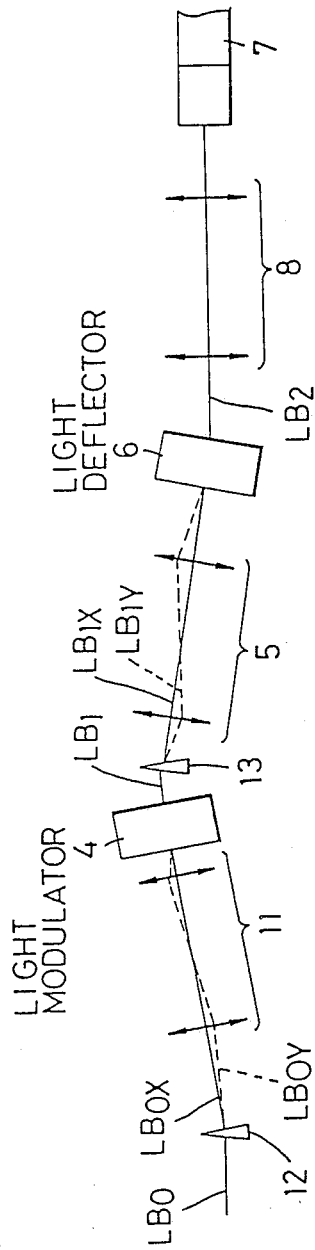
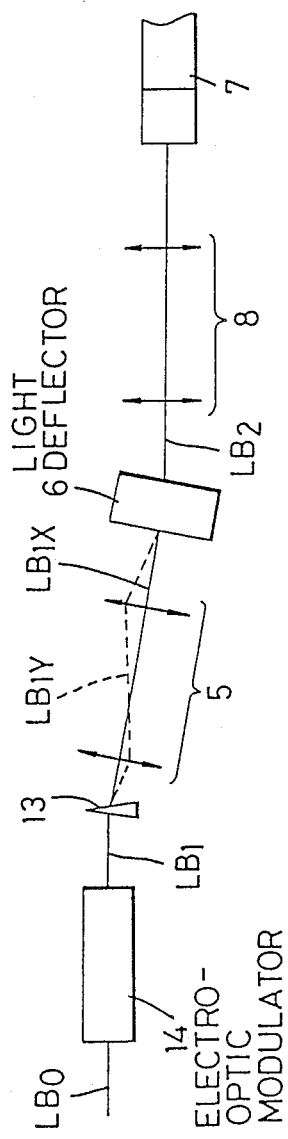
FIG. 3 PRIOR ART
FIG. 4

LASER BEAM DEPICTING APPARATUS

This is a continuation-in-part application of Ser. No. 192,685 filed May 10, 1988 now abandoned.

BACKGROUND OF THE INVENTION

1. Field of the Invention

This invention relates to a laser beam depicting apparatus, and is particularly suitable for application to a laser beam depicting apparatus for depicting patterns and to a laser beam working apparatus.

2. Related Background Art

In a laser beam depicting apparatus of this type, use has been made of raster scanning as shown in FIG. 1 of the accompanying drawings, in which a desired wiring pattern is directly depicted on a photosensitive member 2 to form a photo-mask which is a printing negative when the wiring pattern is to be printed on a printed substrate.

That is, a laser beam LB0 emitted from a laser source 3 is ON-OFF-modulated by an ultrasonic light modulator 4 in accordance with image data, and the modulated laser beam LB1 passes through a compressor lens system 5 to a light deflector 6 such as an ultrasonic deflector. The laser beam LB2 emerging from the light deflector 6 is compensated by having an angle of deflection matching the "tilting" error of each reflecting surface of a rotational polygonal mirror 7, and the laser beam LB2 after being compensated passes through an expander 8 to the rotational polygonal mirror 7.

The laser beam LB2 having entered the rotational polygonal mirror 7 is deflected and scanned by the rotating reflecting surfaces of the rotational polygonal mirror, and the deflected and scanned laser beam LB3 passes through an fθ lens 9 and is raster-scanned at a uniform speed on the scanning surface of the photosensitive member 2 placed on a movable stage 10 in synchronism with the rotation of the rotational polygonal mirror 7.

Now, in effect, to ON-OFF-operate the light modulator 4 with high sensitivity, it is necessary to stop down the incident laser beam finely and for this purpose, a compressor lens system 11 is also provided on the incidence side of the light modulator 4 as shown in FIG. 2 of the accompanying drawings which shows the construction of an optical system.

The aforementioned tilting error of the rotational polygonal mirror 7 is the working error of the polygonal mirror and is representative of the degree of inclination of each surface of the polygonal mirror relative to the rotary shaft. When there is such a tilting error, the deflecting and scanning plane of the laser beam LB3 deviates and the pitch of the scanning lines does not become constant. The light deflector 6 controls the angle of deflection of the laser beam LB2 in synchronism with the scanning of each surface of the rotational polygonal mirror 7 to thereby correct it so that no irregularity of scanning may occur.

By moving the movable stage 10 in synchronism with the raster scanning in this manner, a two-dimensional image can be depicted on the surface of the photosensitive member 2.

When an image is to be depicted on a photosensitive member 2 of relatively high sensitivity such as a lith film, a laser producing a laser beam LB0 of single wavelength is used as the laser source 3.

However, when an image is to be depicted on a photosensitive member 2 of relatively low sensitivity such as dry film resist laminated on a copper layered plate such as a printed substrate, the laser light of single wavelength is insufficient in energy density and therefore, a method of producing a laser beam LB0 of plural wavelengths by the use of a laser of the type oscillating plural wavelengths at the same time, such as an argon ion laser, and thereby enhancing the energy density of a laser beam LB3 applied to the photosensitive member 2 has been proposed.

However, the light modulator 4 and light deflector 6 in the prior-art apparatus are essentially elements utilizing the diffraction phenomenon of light and therefore, firstly, where the laser beam on the incidence side includes light of plural wavelengths, there occurs so-called color dispersion in which the optical path differs depending on the wavelength of the emitted laser beam and thus, there occurs color misregistration to the light spot of the laser beam applied to the photosensitive member, and this has led to the problem that a clear and minute image cannot be obtained Secondly, light energy is concentrated on the light modulator 4 by the compressor lens system 11, and this leads to the undesirable possibility that thermal destruction of the light modulator 4 may occur.

As a method of compensating for such color dispersion, I have proposed a method as shown in FIG. 3 of the accompanying drawings wherein a prism 12 is inserted forwardly of a compressor lens system 11 and a prism 13 is inserted forwardly of a compressor lens system 5, whereby a laser beam including plural wavelength components $LB_{0X}$, $LB_{0Y}$) and $LB_{1X}$, $LB_{1Y}$) is color-dispersed in advance and extracted by means of the prisms 12 and 13 and is caused to enter a light modulator 4 and a light deflector 6, and laser beams LB1 and LB2 in which the plural wavelength components overlap each other are caused to emerge therefrom (Japanese Laid-Open Patent Application No. 61-193130).

However, in the construction as shown in FIG. 3, firstly, the light beams of all wavelengths are finely stopped down by the compressor lens system 11 and enter the light modulator 4 and thus, the light modulator 4 comprising an ultrasonic modulator may be thermally destroyed.

Secondly, the light deflector 6 is comprised of an ultrasonic deflecting element for varying the frequency of the input ultrasonic wave and changing the angle of diffraction of light to thereby deflect the laser beam and therefore, with the variation in the angle of deflection, the degree of color dispersion (i.e., the expanse of the beam of the component wavelengths separated by color dispersion) becomes different.

Accordingly, if within a range in which the tilting error of the rotational polygonal mirror 7 is small and the distribution band of the wavelength components of the laser beam LB0 is narrow, color dispersion can be compensated for by causing the color dispersion in advance by the prism 13, but if the tilting error of the rotational polygonal mirror 7 is great and the distribution band of the wavelength components of the laser beam LB0 becomes wide, for example, like an argon ion laser, the color dispersion can no longer be compensated for by the prism 13.

This results in creation of significant color misregistration on the photosensitive member 2 on which depiction is effected.

SUMMARY OF THE INVENTION

I have previously devised a method of using an electro-optical modulator 14 which effects light modulation by the electro-optical effect, instead of a light modulator which is an ultrasonic modulator, as shown in FIG. 4 of the accompanying drawings, to avoid the thermal destruction attributable to the concentration of energy by the compressor lens system, and it was laid open as Japanese Laid-Open Patent Application No. 63-36222 on Feb. 16, 1988.

This light modulating means 14 can ON-OFF-modulate the incident light beam at a high speed by the electro-optical effect even if he incident light beam is not finely stopped down, and therefore it can effectively avoid thermal destruction and can also eliminate the prism 12 and compressor lens system 11 of FIG. 3.

The present invention has as its object the provision of a laser beam depicting apparatus in which color misregistration during laser beam depiction can be suppressed.

According to the present invention, a laser beam depicting apparatus adapted to depict a raster image by modulating a laser beam LB0 by image data and raster-scanning the laser beam by the reflecting surfaces of a rotational polygonal mirror is provided with a laser source for producing a laser beam LB0 by oscillating light components of plural wavelengths at the same time, light modulating means for modulating the laser beam LB0 without causing color dispersion, a light deflector for correcting any deviation in the direction of deflection of a laser beam LB3 caused by the tilting error of each reflecting surface of the rotational polygonal mirror without causing color dispersion, and an fθ lens having its chromatic aberration corrected for condensing the laser beam LB3 deflected by the rotational polygonal mirror in order to rasterscan an object to be depicted.

Each wavelength component of the laser beam LB0 is subjected to ON-OFF modulation in an electro-optical modulator on the basis of depiction information and emerges from the electro-optical modulator during ON modulation, but color dispersion does not occur. The laser beam LB1 subjected to the modulation enters the light deflector.

In order to compensate for the tilting error of each reflecting surface of the rotational polygonal mirror, the light deflector deflects the laser beam LB2 to a desired angle in synchronism with each reflecting surface of the rotational polygonal mirror.

Thus, color misregistration can be suppressed during the depiction by the laser beam LB3 of high output including plural wavelengths.

BRIEF DESCRIPTION OF THE DRAWINGS

FIGS. 2 and 3 are schematic diagrams showing a laser beam modulating and deflecting optical system according to the prior art.

FIG. 4 is a schematic diagram showing a laser beam modulating and deflecting optical system using an electro-optical modulator

DESCRIPTION OF THE PREFERRED EMBODIMENT

Figure 1:
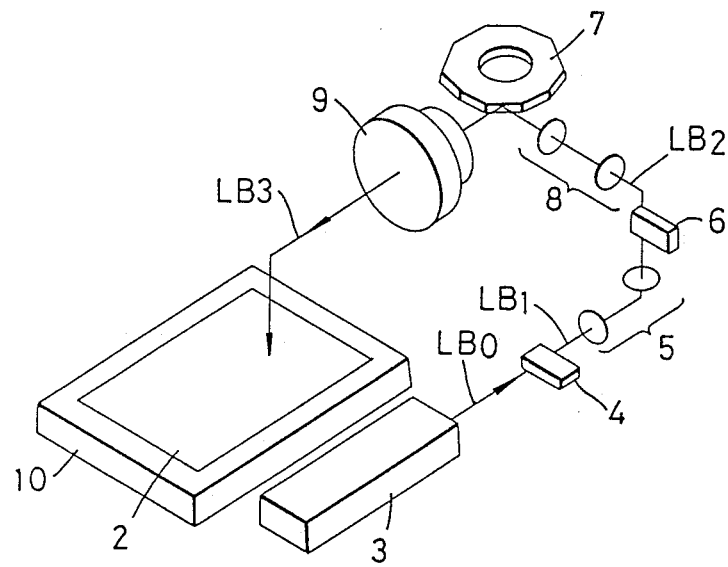
FIG. 1 is a schematic block diagram showing a laser beam depicting apparatus according to the prior art.
Figure 2:
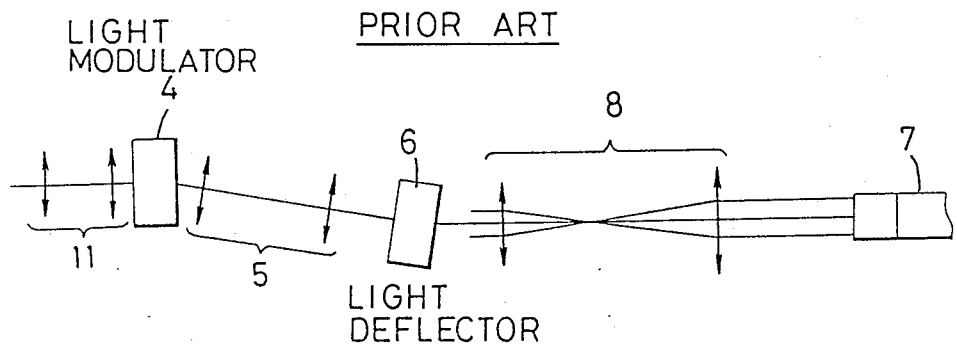
Figure 5:
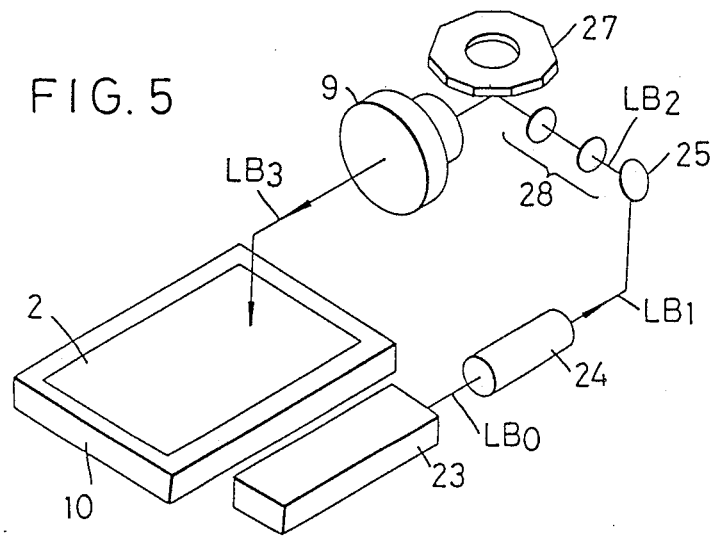
FIG. 5 is a schematic perspective view showing an embodiment of a laser beam depicting apparatus according to the present invention.
Figure 6:
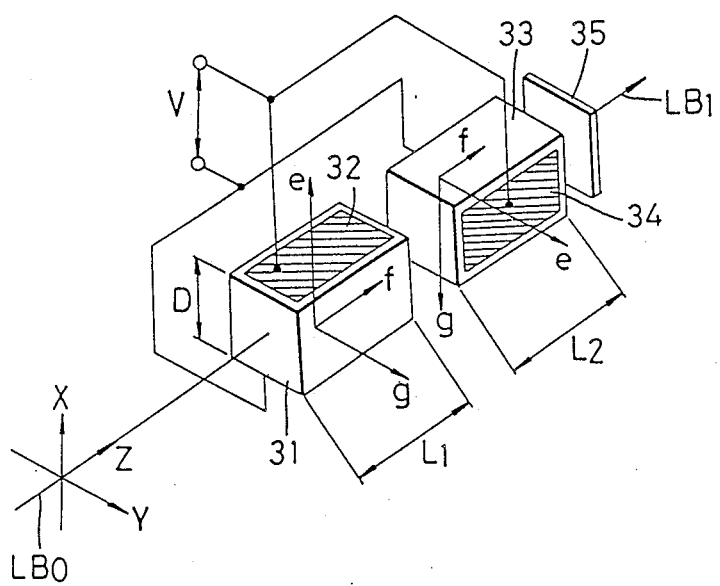
FIG. 6 is a perspective view of an electro-optical modulator.

In FIGS. 5 and 6, a laser source 23 comprising an argon ion laser oscillates at the same time laser light of plural wavelengths distributed over a wide range, and high-output-oscillates light of wavelengths 488 nm and 515 nm.

A laser beam LB0 including the plural wavelengths generated in the laser source 23 enters an electro-optical modulator 24. The electro-optical modulator 24, as shown in FIG. 6, is provided with a plurality of electro-optical crystals 31 and 33 disposed about the optic axis Z with their optical axes e inclined by 90° with respect to each other, and modulates light beams of different wavelengths $\lambda_1$ and $\lambda_2$ at the same time by compensating for natural double refraction created in one of the electro-optical crystals by natural double refraction created in the other of the electro-optical crystals.

The electro-optical crystal 31 comprises a uniaxial crystal producing the Pockels effect, such as ADP ($NH_4H_2PO_4$) or KDP ($KH_2PO_4$), and is worked into the shape of a rectangular parallelopiped so that the thickness in the optical axial direction e thereof is D and the length in a direction f orthogonal to the optical axial direction e is L1, and electrodes 32 are provided on the two opposed surfaces of the crystal which are perpendicular to the optical axial direction e and parallel to the direction f.

Referring to FIG. 6, in which the X and Y directions are orthogonal to each other and to the optic axis Z of light beam modulator 24, the electro-optical crystal 31 is disposed so that the optical axial direction e is the same as the X direction and the lengthwise direction f is the same as the direction of the optic axis Z, and a direction g orthogonal to both the optical axial direction e and the lengthwise direction f is the same as the Y direction.

The electro-optical crystal 31 is a uniaxial crystal and therefore, if the refractive index in the optical axial direction e with no voltage applied between the electrodes 32 is expressed in terms of $n_e$ (extraordinary ray refractive index) and the refractive index in the direction f orthogonal to the optical axial direction e is expressed in terms of $n_o$ (ordinary ray refractive index), $n_e$ and $n_o$ are represented by the following formula:

$$n_e \neq n_o \tag{1}$$

Further, if the refractive index in the X direction is $nx_1$ and the refractive index in the Y direction is $ny_1$ when a voltage V is applied between the electrodes 32, the refractive indices $nx_1$ and $ny_1$ assume the values represented, for example, by the following equations:

$$nx_1 = n_e \quad (2)$$

$$ny_1 = n_o + \tfrac{1}{2}n_o^3 r_{63}\frac{V}{D} \quad (3)$$

where $r_{63}$ is an electro-optical coefficient.

Accordingly, when the laser beam LB0 of linearly polarized light having a plane of polarization forming an angle of 45° with respect to the direction X and the direction Y along the optic axis Z enters the electro-optical crystal 31, the X direction component and Y direction component of the electric field vector of the laser beam are changed in their phases by phases $\theta_{1x}$ and $\theta_{1y}$, respectively, expressed by the following equations when they are propagated through the electro-optical crystal 31:

$$\theta_{1x} = \frac{2\pi}{\lambda}(n_e L1) \quad (4)$$

$$\theta_{1y} = \frac{2\pi}{\lambda}\left(n_o + \tfrac{1}{2} n_o^3 r_{63}\frac{V}{D}\right)L1 \quad (5)$$

where $\lambda$ is the wavelength of the laser beam.

As a result, the phase difference to which the laser beam is subjected by the electro-optical crystal 31 assumes the value expressed by the following equation:

$$\begin{aligned}\theta_1 &= \theta_{1x} - \theta_{1y} \\ &= \frac{2\pi}{\lambda}(n_e - n_o)L1 - \frac{2\pi}{\lambda}\cdot\frac{n_o^3 r_{63}}{2}\cdot\frac{L1}{D}V\end{aligned} \quad (6)$$

Incidentally, the first term in equation (6) represents the phase difference occurring when no voltage is applied, and is due to natural double refraction.

This means that when in equation (6), $\theta_1 = 2N\pi$ (N: integer), a laser beam having a plane of polarization the same as that of the incident laser beam emerges from the electro-optical crystal 31 and when the phase difference $\theta_1 = (2N-1)\pi$, a laser beam having a plane of polarization orthogonal to that when the phase difference $\theta_1 = 2N\pi$ emerges from the electro-optical crystal 31.

Another electro-optical crystal 33 is formed of the same material as the electro-optical crystal 31 and is optically of the same shape and the same dimensions as the latter.

The electro-optical crystal 33 is disposed so that the optical axial direction e thereof is the Y direction (that is, it is inclined by 90° about the optic axis Z with respect to the optical axial direction e of the electro-optical crystal 31), and the electrodes 34 thereof are parallel-connected to the electrodes 32 of the electro-optical crystal 31.

Accordingly, in the electro-optical crystal 33, which is inclined by 90° with respect to the electro-optical crystal 31, when the refractive index in the x direction is $nx_2$ and the refractive index in the Y direction is $ny_2$, the refractive index $ny_2$ is of the same value as the refractive index $nx_1$ of the electro-optical crystal 31 in the X direction shown in equation (2), that is, assumes the value expressed by $$ny_2 = n_e \quad (7)$$

In contrast, the refractive index $nx_2$ in the X direction, when the sense of the applied voltage is chosen to a predetermined direction relative to the electro-optical crystal 31, assumes the value expressed by the following equation correspondingly to the refractive index $ny_1$ of the electro-optical crystal 31 in the Y direction shown in equation (3):

$$nx_2 = n_o + \tfrac{1}{2}n_o^3 r_{63}\frac{-V}{D} \quad (8)$$

Thus, when the length of the electro-optical crystal 33 is L2, the X direction and Y direction components of the electric field vector of the laser beam are changed in their phases by phase differences $\theta_{2x}$ and $\theta_{2y}$ expressed by the following equations when they are propagated through the electro-optical crystal 33:

$$\theta_{2x} = \frac{2\pi}{\lambda}\left(n_o - \tfrac{1}{2}n_o^3 r_{63}\frac{V}{D}\right)L2 \quad (9)$$

$$\theta_{2y} = \frac{2\pi}{\lambda} n_e L2 \quad (10)$$

Accordingly, the X direction component of the electric field vector of the laser beam having entered the electro-optical crystal 31 is first changed in its phase by the phase difference $\theta_{1x}$ expressed by equation (4) by the electro-optical crystal 31, whereafter in the electro-optical crystal 33, it is changed in its phase by the phase difference $\theta_{2x}$ shown in equation (9), with a result that when it is propagated through the electro-optical crystals 31 and 33, it is changed in its phase by a phase difference $\theta_x$ expressed by the following equation:

$$\begin{aligned}\theta_x &= \theta_{1x} + \theta_{2x} \\ &= \frac{2\pi}{\lambda}n_e L1 + \frac{2\pi}{\lambda}\left(n_o - \tfrac{1}{2}n_o^3 r_{63}\frac{V}{D}\right)L2\end{aligned} \quad (11)$$

Likewise, the Y direction component of the electric field vector of the laser beam is first changed in its phase by the phase difference $\theta_{1y}$ expressed by equation (5) by the electro-optical crystal 31, whereafter in the electro-optical crystal 33, it is changed in its phase by he phase difference $\theta_{2y}$ expressed by equation (10), with a result that as a whole, it is changed in its phase by a phase difference $\theta_y$ expressed by the following equation;

$$\begin{aligned}\theta_y &= \theta_{1y} + \theta_{2y} \\ &= \frac{2\pi}{\lambda}\left(n_o + \tfrac{1}{2}n_o^3 r_{63}\frac{V}{D}\right)L1 + \frac{2\pi}{\lambda}n_e L2\end{aligned} \quad (12)$$

Accordingly, from equations (11) and (12), the phase difference of the laser beam emerging from the electro-optical crystal 33 assumes the value $\theta$ expressed by the following equation:

$$\begin{aligned}\theta &= \theta_x - \theta_y \\ &= \frac{2\pi}{\lambda}\left\{(n_e - n_o)\Delta L - \tfrac{1}{2}n_o^3 r_{63}\frac{L12}{D}V\right\}\end{aligned} \quad (13)$$

$$\Delta L = L1 - L2 \quad (14)$$

$$L12 = L1 + L2 \quad (15)$$

Here the electro-optical crystals 31 and 33 are optically of the same shape and the same dimensions and therefore, ΔL expressed by equation (13) becomes equal to 0.

Accordingly, equation (13) assumes a value expressed by the following equation:

$$\theta = -\frac{\pi}{\lambda} n_0^3 \, r_{63} \frac{L12}{D} V \qquad (16)$$

This means that the so-called natural double refraction which has occurred in the electro-optical crystal 31 has been completely compensated for by the electro-optical crystal 33, and also means that irrespective of the wavelength λ, the phase difference θ becomes 0 when the applied voltage V is 0 [V].

Accordingly, when the applied voltage V=0 [V], the phase difference θ between the laser beam components whose electric field vectors are in the X direction and Y direction becomes 0, and the laser beam enters an analyzer 35 with a plane of polarization in the same direction as the plane of polarization with which it has entered the electro-optical crystal 31.

When the transmittance of the electro-optical crystal 31 is τ and the intensity of the incident laser beam LB0 is I0, the intensity I of the emergent light LB1 obtained through the analyzer 35 assumes a value expressed by the following equation relative to the phase difference $\theta_1$ caused by the electro-optical crystal 31:

$$I = \frac{\tau I0}{2} (1 - \cos\theta_1) \qquad (17)$$

and the intensity I of the emergent light varies in conformity with the phase difference $\theta_1$ changing with a change in the applied voltage V as shown in the aforementioned equation (6).

If the plane of polarization of the analyzer 35 is set so as to form an angle of 45° with respect to the Y direction, the quantity of light of the emergent light obtained through the analyzer 35 as a result becomes theoretically 0 from equation (17) and thus, irrespective of the wavelength λ of the laser beam, a well extinguished state can be obtained.

Thus, the electro-optical modulator 24 has a construction which does not cause color dispersion. The laser beam LB1 emerging from the elctro-optical modulator 24 is applied to a light deflector 25.

Figure 7:
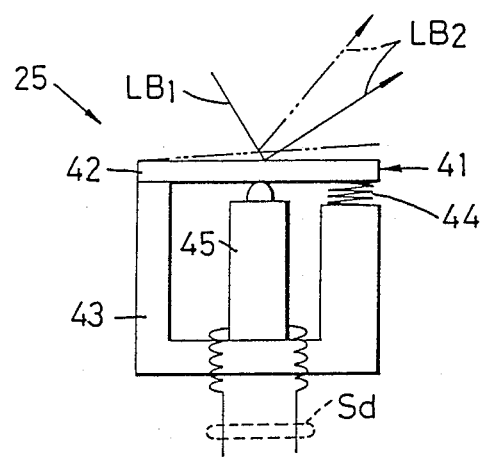
FIG. 7 is a side view showing a light modulator.

The light deflector 25, as shown in FIG. 7, has a mirror 41 pivotable about a fulcrum portion 42 relative to a base member 43, and the mirror 41 is urged against an actuator 45 comprising a piezo-electric element by a spring member 44 provided on the free end of the mirror 41. The actuator 45 is expanded and contracted by a deflection control signal Sd and the mirror 41 is pivotally controlled, whereby the mirror 41 reflects the incident laser beam LB1 at an angle of reflection corresponding to the deflection control signal Sd and thereby, the angle of deflection of the reflected laser beam LB2 can be adjusted.

Figure 8:
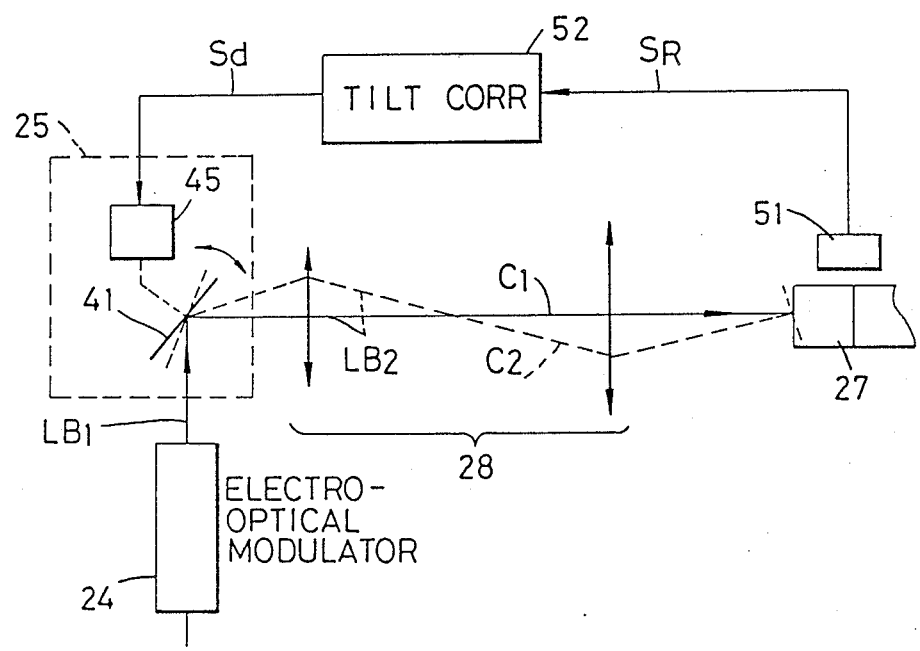
FIG. 8 is a schematic block diagram showing the detailed construction of FIG. 5.

The deflection control signal Sd is produced by a tilting correcting circuit 52 on the basis of the detection signal $S_R$ of an encoder 51 for detecting the angularly rotated position of a rotational polygonal mirror 27, as shown in FIG. 8. The tilting correcting circuit 52 has a memory, and prestores in the memory correction amount data corresponding to the tilting error amount $\epsilon_N$ of each reflecting surface of the rotational polygonal mirror 27, and reads out the corresponding correction amount data from the memory by the detection signal $S_R$ of the encoder 51 when each reflecting surface has come to an angularly rotated position for receiving the laser beam LB2, and delivers the deflection control signal Sd.

Thus, the mirror 41 of the light deflector 25 has its pivotally moved position controlled so as to cause the laser beam LB1 of the electro-optical modulator 24 to pass along the reference optical path C1 of an expander system 28 to the rotational polygonal mirror 27, as indicated by solid line in FIG. 8, when there is no tilting in the reflecting surfaces.

In contrast, when there is a tilting in the reflecting surfaces, the mirror 41 of the light deflector 25 has its pivotally moved position controlled so as to cause the laser beam LB2 to pass along an optical path C2 to the rotational polygonal mirror 27, as indicated by broken line in FIG. 8.

The expander system 28 is designed such that the point of reflection of the laser beam LB2 on the reflecting surface of the mirror 41 of the light deflector 25 and the point of reflection of the laser beam LB2 on the reflecting surface of the rotational polygonal mirror 27 have a conjugate relation. Thus, the laser beam LB2 always enters the same point on the reflecting surface of the polygonal mirror even during the deflection control.

In the above-described construction, each wavelength component of the laser beam LB0 emitted from the argon ion laser 23 is subjected to ON-OFF modulation free of color misregistration in the electro-optical modulator 24 in conformity with depicting information, and the laser beam LB1 emerging therefrom enters the light deflector 25.

The light deflector 25 changes the angle of deflection of the mirror 41 on the basis of the deflection control signal Sd from the tilting correcting circuit 52 in synchronism with the rotation of the rotational polygonal mirror 27 for each reflecting surface thereof, and compensates for the tilting error of the rotational polygonal mirror 27.

Incidentally, when the reflecting surfaces of the rotational polygonal mirror whose tilting error is ε are to be scanned by the laser beam LB2, the mirror 41 is inclined by Mε (M being the magnification of the expander system 28) by the deflection control signal Sd. As a result, the angle of deflection of the laser beam LB2 reflected by the mirror 41 is 2Mε, and correction can be accomplished so that the laser beam LB3 reflected from the rotational polygonal mirror is in the plane of rotation thereof.

Thus, the law of reflection applies to all of the light components of plural wavelengths included in the laser beam LB2, irrespective of the wavelengths, and therefore, no color dispersion occurs to the laser beam LB2 emerging from the light deflector 25.

The above embodiment has been described with respect to a case where an electro-optical modulator is used as the light modulating means for modulating the laser beam LB0 by image information, but the light modulating means is not limited thereto. Other means for modulating the laser beam without causing color dispersion may be employed.

Also, the above embodiment has been described with respect to a case where the expander system 28 is interposed between the light deflector and the rotational polygonal mirror, but when the tilting error ε of each reflecting surface of the rotational polygonal mirror is relatively slight and the angle of deflection of the laser beam LB2 entering each reflecting surface is minute, the expander system 28 may be eliminated and an effect similar to what has been described above may still be obtained.

Also, the expander system 28 may be disposed before the light deflector to obtain an effect similar to what has been described above. The actuator of the light deflector may be of various constructions such as, for example, one constructed of a bimorph type piezoelectric vibrator having one surface thereof made into a reflecting surface.

Further, a reflection type piezo-electric deflector has been employed as the deflector, but this is not restrictive. Other means may be employed. Use may be made of any means capable of deflecting light at a high speed without causing color dispersion to the laser beam LB1 including plural wavelengths.

Each embodiment which will hereinafter be described relates to improvements in a system in which modulation of a light beam and correction of tilting error are made possible by the use of two acousto-optical elements as in the aforedescribed construction of FIG. 3. Terminology used in the equations appearing in the foregoing description has been defined in connection with those equations. Terminology used in the equations which appear in the description hereinafter will be defined in connection with these equations, and, to avoid any confusion, should not be considered in connection with the equations heretofore.

As is apparent from FIG. 3, at least one dispersing optical system for compensation has heretofore been necessary for one acousto-optical element to compensate for the color dispersion of individual acousto-optical elements. That is, compensating optical systems 11 and 12 have been provided for an ultrasonic light modulator 4 and compensating optical systems 5 and 13 have been provided for an ultrasonic light deflector 6.

Accordingly, a composite system including a plurality of acousto-optical elements will be of a complex construction requiring a number of parts including a dispersing optical member such as a prism, and a relay lens system or the like for making the respective acousto-optical elements and said dispersing optical member conjugate with one another.

An increased number of parts not only leads to much labor required for maintenance, for example, but also leads to an increase in energy loss resulting from an increase in the transmitting surfaces of the lens, and is a serious disadvantage particularly when images are formed on a photosensitive member of low sensitivity at a high speed.

Also, in the situation in which compactness of the entire apparatus is desired, in the optical system of this type, the focal length of the relay lens must be relatively long from the viewpoints of the limit of chromatic aberration correction and the resolution of the diffracted light of the acousto-optical elements and therefore, the repeated use of a relay lens system causes a problem in that the optical path length is made very long.

So, in the following embodiment, a dispersing optical system is disposed which compensates for color dispersion caused in a plurality of acousto-optical elements as a composite system.

Before describing the construction of the embodiment, mention will briefly be made of the construction of an acousto-optical element and the mechanism of the color dispersion occurring therein.

Figure 9:
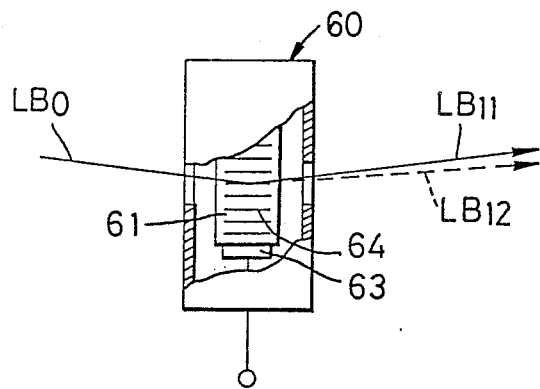
FIG. 9 is a partly cross-sectional view schematically showing the construction of an acousto-optical element.

Generally, the acousto-optical element 60 is of such a construction as shown in FIG. 9 wherein an ultrasonic wave enters an ultrasonic medium 61 such as glass or optical crystal from a transducer 63.

When the velocity of sound in the medium is V and the frequency of the ultrasonic wave is F, there is created a travelling wave of wavelength V/F in the medium, and an incident light beam LBO is diffracted like a diffraction grating by the wave surface 64 thereof. When the wavelength of the incident light beam is λ, the angle of diffraction θ is represented by the following expression (18):

$$\theta \approx \frac{\lambda F}{V} \qquad (18)$$

Where the incident light beam LBO includes, for example, two wavelength components, those components exit at different angles of diffraction as is apparent from the expression (18) and therefore, the light beam is separated as shown by LB11 and LB12 in FIG. 9.

Generally, where the incident light beam has a wavelength range of Δλ, it will exit with the expanse of an angle of diffraction represented by the following equation (19);

$$\Delta\theta = \frac{F}{V} \Delta\lambda \qquad (19)$$

Therefore, even if the chromatic aberration of the other optical system is corrected well, the color dispersion occurring in the acousto-optical element will remain and significantly degrade the quality of the beam spot finally obtained.

Figure 10:
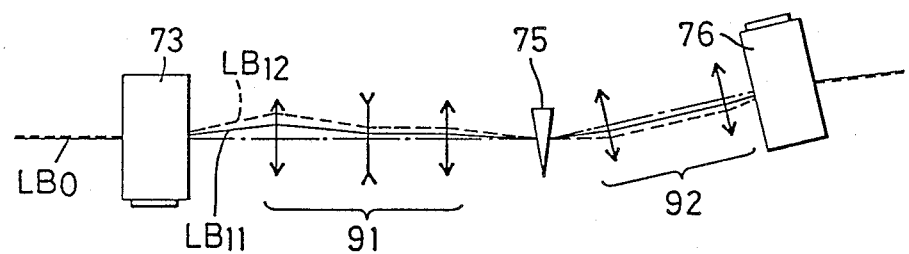
FIG. 10 is a schematic view showing a laser beam modulating and deflecting optical system according to another embodiment of the present invention.

FIG. 10 shows an embodiment in which a prism is used as a dispersing optical member.

In this embodiment, the dispersing optical system comprises a single prism 75 and relay lens systems 91 and 92 disposed at the entrance and exit sides thereof.

In FIG. 10, a laser beam LBO including a plurality of wavelengths $\lambda_1$ and $\lambda_2$ ($\lambda_1 \neq \lambda_2$) enters an acousto-optical modulator 73. When the velocity of sound in the medium of the modulator 73 is $V_1$ and the frequency of the ultrasonic wave is $F_1$, from the expression (18), the angle of diffraction of a laser beam of wavelength $\lambda_i$ (i=1, 2, ...) is represented as follows with the counterclockwise direction as the positive with the direction of the incident laser beam LBO as the reference:

$$\theta_i = \frac{\lambda_i F_1}{V_1} \qquad (20)$$

The laser beam LBO which has entered the modulator 73 is separated into LB11 and LB12 for the wavelengths $\lambda_1$ and $\lambda_2$ in accordance with the equation (20) and exits.

Let it be assumed that the magnification of the relay lens system 91 is $m_1$. The relay lens system 91 is disposed so as to cause a parallel beam of incidence diameter Φ to exit as a parallel beam of diameter $|m_1\Phi|$ and make the modulator 73 and the prism 75 conjugate with each other and therefore, the laser beams LB11 and LB12 again arrive at the same position on the prism 75. Here, the angle of the laser beam is represented as follows with the direction of the incident beam LBO as the reference:

$$\phi_i = \frac{1}{m_1} \theta_i \quad (21)$$

When the refractive index of the glass forming the prism for a wavelength $\lambda_i$ is $n_i$ ($i=1, 2, \ldots$) and the vertical angle of the prism is a, the incident light exits being given an angle of deviation $\delta_i$ represented by the following equation (22):

$$\delta_i = (n_i - 1)a \quad (22)$$

Accordingly, the laser beam after having exited from the prism exits in the direction of $\delta_i + \phi_i$ if the direction of the incident beam LBO is the reference.

The relay lens system 92 is disposed so as to cause a parallel beam of incidence diameter $\Phi$ to exit as a parallel beam of diameter $|m_2\Phi|$, like the relay lens system 91, if the magnification thereof is $m_2$ and make the prism 75 and the acousto-optical deflector 76 conjugate with each other.

The angle of the laser beam after having exited from the relay lens system 92 is represented as follows with the direction of the incident beam LBO as the reference:

$$\tau_i = \frac{1}{m_2} (\delta_i + \phi_i) \quad (23)$$

The laser beam again separated into the beam LB11 of wavelength $\lambda_1$ and the beam LB12 of wavelength $\lambda_2$ by the prism 75 again arrives at the same position on the deflector 76 by the relay lens system 92.

The angle of diffraction $\epsilon_i$ given to the incident beam b the deflector 76 is represented by the following equation when the velocity of sound in the medium is $V_2$ and the frequency of the ultrasonic wave is $F_2$ and the direction of the diffracted light is considered so that the direction of diffraction is opposite to the modulator 73:

$$\epsilon_i = -\frac{\lambda_i F_2}{V_2} \quad (24)$$

Accordingly, when the direction of the incident beam LBO is the reference, the laser beam after having exited from the deflector 76 is represented by the following equation (25) from the equations (23) and (24):

$$X = \epsilon_i + \tau_i \quad (25)$$

Adjusting the aforementioned equations (20)–(25), the laser beam of wavelength $\lambda_i$ ($i=1, 2, \ldots$) is deflected by an angle represented by the following equation (26) with respect to the direction of the incident laser beam LBO and exits from the deflector 76.

$$X_i = \frac{a}{m_2}(n_i - 1) + \left(\frac{F_2}{m_1 m_2 V_1} - \frac{F_2}{V_2}\right)\lambda_i \quad (26)$$

The difference in the angle of deflection for the wavelengths $\lambda_1$ and $\lambda_2$ is as follows from the equation (26):

$$\Delta X = \frac{a}{m_2}(n_1 - n_2) - (\lambda_2 - \lambda_1)\left(\frac{F_1}{m_1 m_2 V_2} - \frac{F_2}{V_2}\right) \quad (27)$$

If $\Delta X = 0$ in the equation (27), at least the laser beams of wavelengths $\lambda_1$ and $\lambda_2$ will overlap each other on the same optic axis after they exit from the deflector 76.

Of the parameters in the equation (27), $F_1$, $V_1$, $F_2$ and $V_2$ are parameters which are concerned with the material and structure of the acousto-optical element and which affect the other performances of the element as well and therefore, it is difficult in designing to choose any values for them.

Also, $n_1$ and $n_2$ are the constants of the glass of the prism and it is difficult to change them freely.

So, the condition that $\Delta X = 0$ is obtained by chiefly adjusting the values of $a$, $m_1$ and $m_2$. Solving the condition with respect to $a$, the condition for wavelength compensation is:

$$a = \frac{\lambda_2 - \lambda_1}{n_1 - n_2}\left(\frac{F_1}{m_1 V_1} - m_2 \frac{F_2}{V_2}\right) \quad (28)$$

Here, it is difficult to control $a$ which is the vertical angle of the prism to any value and therefore, the magnifications $m_1$ and $m_2$ of the relay lens system are set in designing so that the vertical angle $a$ is of a reasonable value in working.

According to the equation (28), as regards the term $(a_2-a_1)/(n_1-n_2)$, if the refractive index of the glass forming the prism can be represented by a linear function of wavelength, that is, if it can be written as $n = a\lambda$, the equation (29) will no longer depend on wavelength and the equation (28) will be established in a wide wavelength range other than $\lambda_1$ and $\lambda_2$. That is, color dispersion can be completely compensated for. Also, if the vertical angle of the prism is not made as designated due to a manufacturing error or the like and does not satisfy the condition of the equation (28), it is also possible to slightly vary the ultrasonic wave frequency $F_2$ of the deflector 76 at the final stage of regulation so as to satisfy the equation (28).

However, generally, the refractive index of glass is non-linear for wavelength, as represented by a dispersion expression and therefore, some residual dispersion occurs for laser beams of wavelengths other than $\lambda_1$ and $\lambda_2$. The amount of such residual dispersion is represented as follows for the wavelength $\lambda_i$ ($i=1, 2, \ldots$) from the equations (26) and (28):

$$\Delta X_i^p = \left[(\lambda_i - \lambda_1) + (n_i - n_1)\frac{\lambda_2 - \lambda_1}{n_1 - n_2}\right] \cdot \quad (29)$$

$$\left(\frac{F_1}{m_1 m_2 V_1} - \frac{F_2}{V_2}\right)$$

The wavelengths $\lambda_1$ and $\lambda_2$ for which color dispersion should be compensated for can be determined with the value of the equation (29) for the other wavelength $\lambda_i$ ($i=3, 4, \ldots$) taken into account.

Next, as previously described, the acousto-optical deflector 76 varies the frequency $F_2$ of the ultrasonic wave to compensate for the tilting error of a rotational polygonal mirror and deflects the laser beam and therefore, when the laser beam is deflected, the equation (28) is not satisfied, but some color dispersion occurs. When the modulation range is $\pm\Delta F_2$, the ultrasonic wave frequency of the deflector 76 can be written as $F_2\pm\Delta F_2$, and this deviates from the condition of the equation (28) and thus, color dispersion occurs. The amount of such color dispersion is represented as follows from the equation (27):

$$\Delta X_i^1 = \mp(\lambda_i - \lambda_1)\frac{\Delta F_2}{V_2} \tag{30}$$

From the foregoing, the amount of residual dispersion for the wavelength $\lambda_i$ (i=1, 2, ...) when color dispersion is compensated for the wavelengths $\lambda_1$ and $\lambda_2$ is as follows from the equations (29) and (30) on the assumption that the acousto-optical deflector is varied by $F_2\pm\Delta F_2$ to deflect the laser beam:

$$\Delta X_i = \left[(\lambda_i - \lambda_1) + (n_i - n_1)\frac{\lambda_2 - \lambda_1}{n_1 - n_2}\right]. \tag{31}$$

$$\left(\frac{F_1}{m_1m_2V_1} - \frac{F_2}{V_2}\right) \mp (\lambda_i - \lambda_1)\frac{\Delta F_2}{V_2}$$

Here, consider the system of FIG. 10 with respect, for example, to Ar+ laser (wavelengths 457.9, 476.5, 488, 496.5, 514.5 nm, ...). The conditions that $F_1=100$ MHz and $V_1=3000$ m/sec. are set for the acousto-optical modulator and the conditions that $F_2=40$ MHz and $V_2=600$ m/sec. are set as the acousto-optical deflector, and the compensation of the equation (28) is effected for the wavelengths $\lambda_1=488$ nm and $\lambda_2=514.2$ nm.

When the refractive index of the prism is $n_1=1.52224$ and $n_2=1.52049$, $m_1=-10$ and $m_2=-0.5$ and thus, $\alpha\approx 11.6°$.

If the refractive index of the prism is $n_3=1.52165$ and $\Delta F_2=\pm 5$ MHz, for example, for $\lambda_3=496.5$ nm, the amount of residual dispersion represented by the equation (31) is $\Delta X_3=-5.1\times 10^{-4}$ rad$\pm 7.1\times 10^{-5}$ rad, and can thus be made very small.

When as a special solution of the equation (28), the condition that $$\left(\frac{F_1}{m_1V_1} - m_2\frac{F_2}{V_2}\right) = 0$$

is established, that is, when $$m_1m_2 = \frac{F_1}{V_1}\cdot\frac{V_2}{F_2}, \tag{32}$$

the omission of the prism 75 is possible in mathematical expression.

Figure 11:
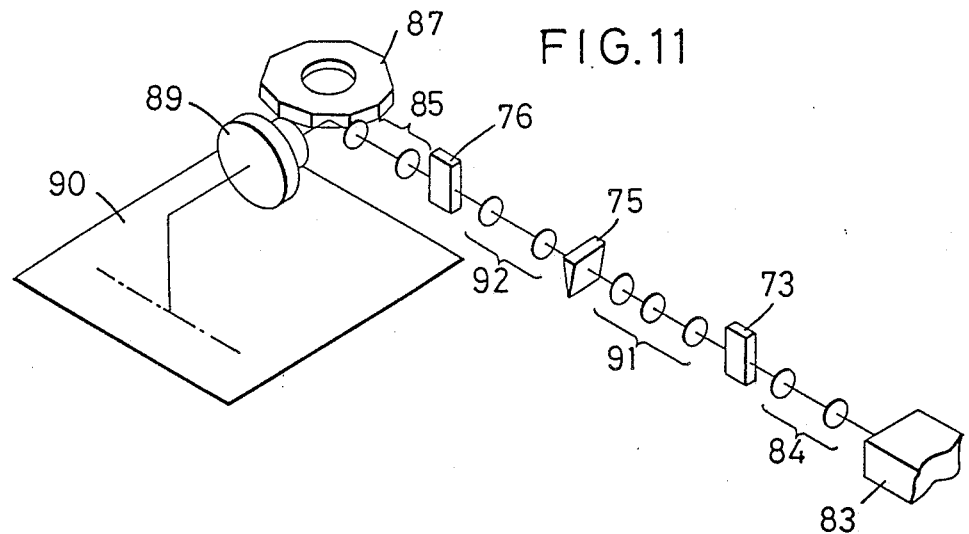
FIG. 11 schematically shows the construction of a laser scanning and depicting apparatus using the optical system of FIG. 10.

FIG. 11 shows the construction of FIG. as it is applied to a laser scanning and depicting apparatus.

A laser beam emitted from a laser source 83, including a plurality of wavelength components, enters the optical systems 73, 91, 75, 92 and 76 of FIG. 10 via a relay lens system 84, exits from the deflector 76, passes through an expander optical system 85, a rotational polygonal mirror 87 and an f-θ lens 89 and impinges on a photosensitive member on a stage 90.

The relay lens system 84 reduces the diameter of the laser beam emitted from the laser source to a suitable diameter. The expander optical system 85 is provided to expand the beam diameter in advance so that the f-θ lens may condense the beam to a predetermined diameter.

As described above, the compensation of the color dispersion occurring in the acousto-optical modulator 73 and the acousto-optical deflector 76 in the present embodiment is accomplished by the prism 75 disposed between the two, the relay lens system 91 disposed at the entrance side thereof for making the acousto-optical modulator 73 and the prism 75 conjugate with each other, and the relay lens system 92 provided at the exit side thereof for making the acousto-optical deflector 76 and the prism 75 conjugate with each other.

Also, the relay lens systems 91 and 92 not only make the acousto-optical elements and the dispersing optical system conjugate with one another, but also have suitable magnifications and compensate for color dispersion by themselves and therefore, the material, the vertical angle, etc. of the prism 75 can be set within reasonable ranges.

Figure 12:
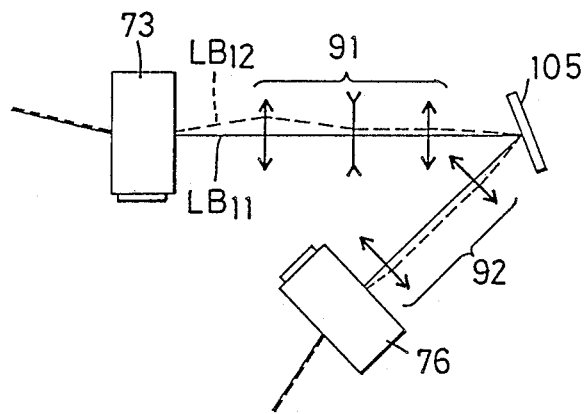
FIG. 12 is a schematic view showing a modification of the laser beam modulating and deflecting optical system.

FIG. 12 shows a case where a diffraction grating 105 is inserted in the position of the prism 75 of FIG. 10.

When the grating pitch of the diffraction grating is d and the direction of diffraction is taken into consideration, the following relation is established instead of the equation (22):

$$\delta_i\approx -\lambda_i/d \tag{22-1}$$

The other equations (20)–(25) are entirely the same as in the aforedescribed case of FIG. 10.

Accordingly, the angle of deflection of the laser beam exiting from the acousto-optical deflector 76 is as follows relative to the incident laser beam LB:

$$X_i^1 = \left(-\frac{1}{m_2d} + \frac{F_1}{m_1m_2V_1} - \frac{F_2}{V_2}\right)\lambda_i \tag{26-1}$$

like the equation (27), $$\Delta X = \left(-\frac{1}{m_2d} + \frac{F_1}{m_1m_2V_1} - \frac{F_2}{V_2}\right)(\lambda_2 - \lambda_1) \tag{27-1}$$

The condition for which $\alpha X=0$ is as follows in the same manner as the equation (28):

$$\frac{1}{d} = \frac{F_1}{m_1V_1} - m_2\frac{F_2}{V_2} \tag{28-1}$$

Since the equation (28-1) does not depend on wavelength, color dispersion can be compensated for a wide wavelength zone. Accordingly, the equation (3) of residual color dispersion can also be written as follows:

$$\Delta X_i' = \mp(\lambda_i - \lambda_1)\frac{\Delta F_2}{V_2} \tag{31-1}$$

The difference between the construction of FIG. 10 and the construction of FIG. 12 is the difference resulting from the use of a prism in FIG. 10 and a diffraction grating in FIG. 12. The prism is better in the transmittance of the system, and the diffraction grating is higher in the compensation effect for color dispersion.

I claim:

1. A laser beam depicting apparatus comprising:
a laser source generating a laser beam having a plurality of light components differing in wavelength;
means generating image data;
electro-optical modulating means for modulating said laser beam in accordance with said image data without causing color dispersion;
a rotational polygonal mirror provided to reflect said modulated laser beam and form a scanning beam;
means for providing correction data representative of a tilting error of each reflecting surface of said rotational polygonal mirror;
deflecting means provided between said electro-optical modulating means and said rotational polygonal mirror for deflecting the laser beam incident on said deflecting means on the basis of said correction data without causing color dispersion, in order to correct error of the direction of said scanning beam caused by said tilting error; and
an $f\theta$ lens provided to condense the scanning beam formed by said rotational polygonal mirror on an object in order to raster-scan said object.

2. The apparatus of claim 1, wherein said deflecting means includes a movable reflecting surface for receiving the laser beam from said modulating means, and driving means for varying the angle of said reflecting surface with respect to the laser beam in accordance with said correction data.

3. The apparatus of claim 2, further comprising an imaging lens system provided between said deflecting means and said rotational polygonal mirror for making the movable reflecting surface of said deflecting means and the reflecting surfaces of said rotational polygonal mirror substantially conjugate with one another on an optic axis.

4. The apparatus of claim 1, wherein said electro-optical modulating means includes first and second electro-optical crystals arranged in series on an optic axis of said laser beam, and an optic axis of said first electro-optical crystal and an optic axis of said second electro-optical crystal are in a plane orthogonal to the optic axis of said laser beam and are orthogonal to each other.

5. The apparatus of claim 4, wherein each of said first and second electro-optical crystals comprises a single-axis electro-optical crystal producing the Pockels effect.

6. The apparatus of claim 4, wherein each of said first and second electro-optical crystals has a pair of surfaces substantially perpendicular to its optic axis, and said electro-optical modulating means further includes means for applying a voltage corresponding to said image data between said pair of surfaces of said first electro-optical crystal and between said pair of surfaces of said second electro-optical crystal.

7. A laser beam depicting apparatus comprising:
a laser source generating a laser beam having a plurality of light components differing in wavelength;
means generating image data;
acousto-optical modulating means for modulating said laser beam in accordance with said image data;
a rotational polygonal mirror provided to reflect said modulated laser beam and form a scanning beam;
means for providing correction data representative of a tilting error of each reflecting surface of said rotational polygonal mirror;
acousto-optical deflecting means provided between said acousto-optical modulating means and said rotational polygonal mirror for deflecting the laser beam incident on said acousto-optical deflecting means on the basis of said correction data in order to correct error of the direction of said scanning beam caused by said tilting error;
compensating means including a dispersing optical element provided between said acousto-optical modulating means and said acousto-optical deflecting means, and optical means for making said acousto-optical modulating means, said dispersing optical element and said acousto-optical deflecting means optically conjugate with one another, said compensating means compensating for the color dispersion of said laser beam occurring in said acousto-optical modulating means and said acousto-optical deflecting means; and
an $F\theta$ lens provided to condense the scanning beam formed by said rotational polygonal mirror on an object in order to raster-scan said object.

8. The apparatus of claim 7, wherein said optical means includes a first imaging in lens system provided between said acousto-optical modulating means and said dispersing optical element, and a second imaging lens system provided between said dispersing optical element and said acousto-optical deflecting means.

9. The apparatus of claim 7, wherein said dispersing optical element includes a prism.

10. The apparatus of claim 7, wherein said dispersing optical element includes a diffraction grating.

* * * * *